(12) United States Patent
Schuttera et al.

(10) Patent No.: US 11,161,614 B2
(45) Date of Patent: Nov. 2, 2021

(54) VEHICLE BUSINESS CLASS SEAT AND STOWAGE SYSTEM

(71) Applicant: SAFRAN CABIN INC., Huntington Beach, CA (US)

(72) Inventors: Christopher Schuttera, Huntington Beach, CA (US); Mark Lyle Shurtleff, Huntington Beach, CA (US); Bruce Tsukasa Shimizu, Huntington Beach, CA (US)

(73) Assignee: SAFRAN CABIN INC., Huntington Beach, CA (US)

( * ) Notice: Subject to any disclaimer, the term of this patent is extended or adjusted under 35 U.S.C. 154(b) by 245 days.

(21) Appl. No.: 16/423,621

(22) Filed: May 28, 2019

(65) Prior Publication Data
US 2020/0108935 A1    Apr. 9, 2020

Related U.S. Application Data

(60) Provisional application No. 62/743,422, filed on Oct. 9, 2018.

(51) Int. Cl.
*B64D 11/06*    (2006.01)

(52) U.S. Cl.
CPC ...... *B64D 11/0602* (2014.12); *B64D 11/0627* (2014.12); *B64D 11/0648* (2014.12)

(58) Field of Classification Search
CPC ............ B64D 11/0602; B64D 11/0627; B64D 11/0636; B64D 11/0648; B60N 3/08; B60N 2/793; A47C 7/622; A47C 7/624; A47C 7/626
See application file for complete search history.

(56) References Cited

U.S. PATENT DOCUMENTS

| | | | | |
|---|---|---|---|---|
| 4,674,713 A * | 6/1987 | Ryan | ...................... | B64D 11/06 244/118.6 |
| 6,170,786 B1 * | 1/2001 | Park | ................... | B64D 11/0638 248/274.1 |

(Continued)

FOREIGN PATENT DOCUMENTS

DE    202004008069 U1    9/2004

OTHER PUBLICATIONS

Extended Search Report issued in EP 19202164.0-1010.

*Primary Examiner* — Richard R. Green
*Assistant Examiner* — William L Gmoser
(74) *Attorney, Agent, or Firm* — Jeffer Mangels; Butler & Mitchell LLP; Brennan C. Swain, Esq.

(57) ABSTRACT

An aircraft that includes a fuselage having a floor, first and second outboard walls and an aisle, and a first seat and storage system that is positioned between the first outboard wall and the aisle. The first seat and storage system includes a seat that includes a seat back and a seat portion, and a storage assembly that includes a storage portion and an extension portion. The storage portion defines a storage interior and a storage opening and includes a cover that is movable between an open position and a closed position. The storage opening faces the aisle. The extension portion extends from the storage portion toward the first outboard wall. The storage assembly defines a top surface to which the seat is secured. The storage assembly defines an under seat cavity below a bottom surface of the extension portion.

19 Claims, 6 Drawing Sheets

(56) References Cited

U.S. PATENT DOCUMENTS

| | | | |
|---|---|---|---|
| 8,118,365 B2* | 2/2012 | Henshaw | B60N 2/242 |
| | | | 297/245 |
| 2001/0000639 A1* | 5/2001 | Park | B60N 2/0224 |
| | | | 297/411.3 |
| 2007/0018494 A1 | 1/2007 | Gutosky | |
| 2009/0146005 A1* | 6/2009 | Bettell | B64D 11/064 |
| | | | 244/118.6 |
| 2014/0332629 A1 | 11/2014 | Hashberger | |
| 2016/0332731 A1* | 11/2016 | Suzuki | E05D 3/14 |
| 2017/0152062 A1* | 6/2017 | Sontag | B64F 5/10 |
| 2017/0267355 A1* | 9/2017 | Porter | B60N 2/146 |
| 2018/0148176 A1* | 5/2018 | Rodriguez | B64D 11/00153 |
| 2020/0001752 A1* | 1/2020 | Metten | B64D 11/0696 |

\* cited by examiner

VEHICLE BUSINESS CLASS SEAT AND STOWAGE SYSTEM

CROSS REFERENCE TO RELATED APPLICATIONS

This application claims the benefit of U.S. Provisional Application No. 62/743,422, filed Oct. 9, 2018, the entirety of which is incorporated herein by reference.

FIELD OF THE INVENTION

The present invention relates generally to aircraft seating, and more particularly to a business class seat that includes storage associated therewith.

BACKGROUND OF THE INVENTION

The need has arisen for a business class type seat that can fit into a narrow, non-constant and/or tapering aircraft fuselage. The size of the cabin and intended service level requires carry-on stowage at each seat in lieu of overhead bins. The combined seat and stowage architecture needs to be able to adapt to a potentially tapering or non-constant fuselage section of the aircraft while remaining manufacturable on a large scale. The combined seat and stowage architecture must also allow incorporation of the many expected amenities of a business class seat (e.g. ample stowage, passenger space, in-flight entertainment functions and enhanced comfort). Current widebody business class seats lack the flexibility necessary for a narrow, non-constant section and/or tapering airframe. Further such widebody business class seats can be too large and heavy for a narrow, non-constant and/or tapering aircraft fuselage due to limitations associated with their lie flat ability and associated seat shell furniture. Current narrow body business class seats are not able to provide the stowage or expected comfort required for a narrow, non-constant and/or tapering aircraft fuselage. Current business jet seats may provide comfort, but are not sized appropriately for a narrow, non-constant and/or tapering aircraft fuselage. The present invention creates an adaptable, manufacturable business class seat system for narrow, tapering, non-constant fuselage applications.

SUMMARY OF THE PREFERRED EMBODIMENTS

In accordance with a first aspect of the present invention there is provided an aircraft that includes a fuselage having a floor, first and second outboard walls and an aisle, and a first seat and storage system that is positioned between the first outboard wall and the aisle. The first seat and storage system includes a seat that includes a seat back and a seat portion, and a storage assembly that includes a storage portion and an extension portion. The storage portion defines a storage interior and a storage opening and includes a cover that is movable between an open position and a closed position. The storage opening faces the aisle. The extension portion extends from the storage portion toward the first outboard wall. The storage assembly defines a top surface to which the seat is secured. The storage assembly defines an under seat cavity below a bottom surface of the extension portion. Preferably, at least a portion of the storage interior is positioned below the seat.

In a preferred embodiment, the first seat and storage system includes a floor riser assembly positioned below the extension portion. The floor riser assembly defines a storage interior and includes a door that is movable between a closed position and an open position where the storage interior is accessible. A top surface of the floor riser assembly partially defines the under seat cavity. Preferably, the floor riser assembly includes an aft portion and a forward portion and the width of the aft portion is less than the width of the forward portion. In a preferred embodiment, the first seat and storage system includes an aft side unit positioned between the seat and the first outboard wall and an upper surface of the aft side unit comprises an arm rest. The aft side unit includes a middle side surface and at least a forward side inclined surface. The seat portion is positioned adjacent the middle surface and the forward inclined surface extends forwardly of the seat portion and inclines toward the aisle.

In a preferred embodiment, the first seat and storage system includes a forward side storage assembly that includes a main body portion that defines a storage interior and a door that is movable between a closed position and an open position where the storage interior is accessible. In one embodiment, the door of the forward side storage assembly is located on a top thereof and is movable upwardly to the open position. In another embodiment, the door of the forward side storage assembly is located on a side thereof and is movable inwardly to the open position. In another embodiment, the forward side storage assembly includes both doors.

In a preferred embodiment, the back portion of the seat is asymmetrical. The back portion includes a center portion and inboard and outboard portions that extend outwardly from the center portion and the outboard portion is wider than the inboard portion. In an embodiment where the fuselage is tapering (where the first and second outboard walls taper from a rear of the fuselage toward a front of the fuselage), a filler panel is positioned between the aft side unit and the first outboard wall and the filler panel has a tapering width. In an embodiment, a first filler panel is positioned between the aft side unit and the first outboard wall and a second filler panel is positioned between the forward side storage assembly and the first outboard wall. The first filler panel has a greater width than the second filler panel.

Preferably, the seat is rotatable with respect to the seat storage assembly between a position where the seat faces forwardly and a position where the seat is angled toward the first wall. Preferably, the first seat and storage system includes a lower side unit positioned below the aft side unit and the forward side storage assembly and the lower side unit defines a lower side unit interior configured to run cables therethrough. The ends can be open to allow passage of the cables or other components.

In accordance with another aspect of the present invention, there is provided a seat and storage system that includes a seat that includes a seat back and a seat portion and a seat storage assembly. The seat includes first and second sides. The seat storage assembly includes a storage portion and an extension portion. The storage portion defines a storage opening and includes a cover that is movable between an open position and a closed position. The storage opening is open to the first side of the seat. The extension portion extends from the storage portion toward the second side of the seat. The storage assembly defines a top surface. The seat is secured to the top surface, and the storage assembly defines an under seat cavity below a bottom surface of the extension portion.

The present invention provides for a modular business class type seat system that can fit into a narrow, non-constant and/or tapering aircraft fuselage. The invention further provides that the seat system is able adapt to the various limitations inherent with a narrow, non-constant and/or tapering aircraft fuselage. Several modular features of the seat system that help achieve this in the preferred embodiment include, but are not limited to, the standard overhead bin is eliminated and stowage within each seat is provided. This allows each passenger to have access and reserved space for their carry-on baggage at their seat. The seat structure may use variable width filler panels to allow the seat system to conform a tapering and/or non-constant fuselage. The seat structure may further use an outboard side ledge sculpted to the seat system to conform a tapering and/or non-constant fuselage. The seat back may be molded symmetrically and then trimmed for either left or right side variations and asymmetrical applications. The seat back arm rest may be formed for enhanced baggage ingress and egress and then finished for either left or right side variations and asymmetrical applications.

The combined seat structure and floor mount baggage stowage allows passengers to sit over their carry-on luggage and provides a mounting structure for the seat by connecting the seat to the floor and fuselage side rails. The seat mounting hardware is designed to allow the seat to be installed at an angle to the longitudinal axis of the aircraft, for example, but not limited to, zero to five degrees. The seat structure may further incorporate a floor riser for elevated seating ergonomics and stowage. The seat structure may further incorporate an adaptable combination lower side ledge unit/closeout which provides space for aircraft systems. The seat structure may further incorporate a forward, upper side ledge which may contain provisions for passenger stowage and/or aircraft systems.

Further these features allow passenger to have their bag located right at their seat, the seat system to have increased stowage and function and the expected comfort levels to be achieved while providing that the seat system can be installed at all locations within a narrow, non-constant and/or tapering aircraft fuselage diameter.

In preferred embodiments, the seat system can also include independent modules that leverage commonality, adaptability, and customization, including but not limited to, D sized baggage compartment that serves as a floor mount and seat base structure, baggage ingress/egress path and retention system and/or economy style seat pan structure with ability to trim for left hand or right hand configurations.

Left and right hand applications are also enabled with, but not necessarily limited to five degrees of rotation relative to the longitudinal axis of the aircraft thus allowing "herringbone" seating positions, varying taxi, takeoff and landing positions, foot wells allowing stretched recline and an ottoman lounge facing inboard where the baggage compartment is used as the ottoman. The present invention can also include an adaptable seat platform (bridges bag compartment to side wall seat rail) and a floor riser for proper seating ergonomics and side ledge laptop stowage, adaptable environmental control and electrical systems routing for length of aircraft, and a side ledge inner structure and valance panel common side ledge arm rest in combination with an adaptable side ledge inner and valance panel.

Preferably, the layout is intended to be one passenger seat, one aisle and one passenger seat across the width of the aircraft. Alternatively the layout may be any combination of seats and aisles across the width of the aircraft. The present invention can be used in scenarios other than an aircraft. For example, the invention can be used in other modes of transportation including but not limited to trains, cars, buses and vertical take-off and landing autonomous aircraft.

It will be appreciated by those of ordinary skill in the art that the various features outlined to achieve a business class seat for a non-constant, tapering and/or narrow diameter fuselage can be implemented individually or in combination without limitation.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
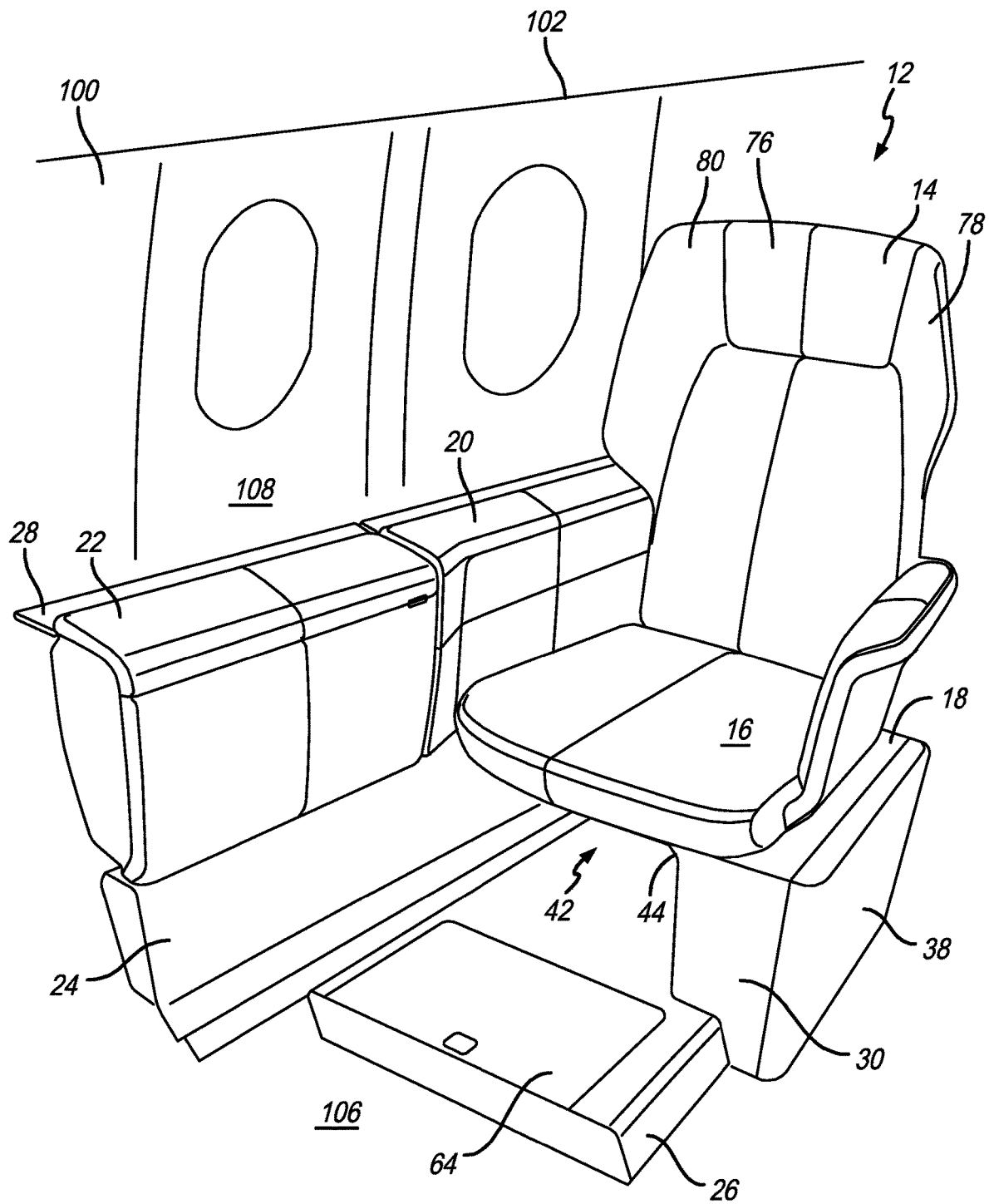
FIG. 1 is a perspective view of a seat and storage system in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-6 show a seat arrangement or seat and storage system 10. In an exemplary embodiment, the seat and storage system 10 can be used in an aircraft 100 with a tapering fuselage 102, such as a supersonic jet. However, this is not a limitation on the present invention and the assembly can be used in other aircraft and vehicles.

Figure 2:
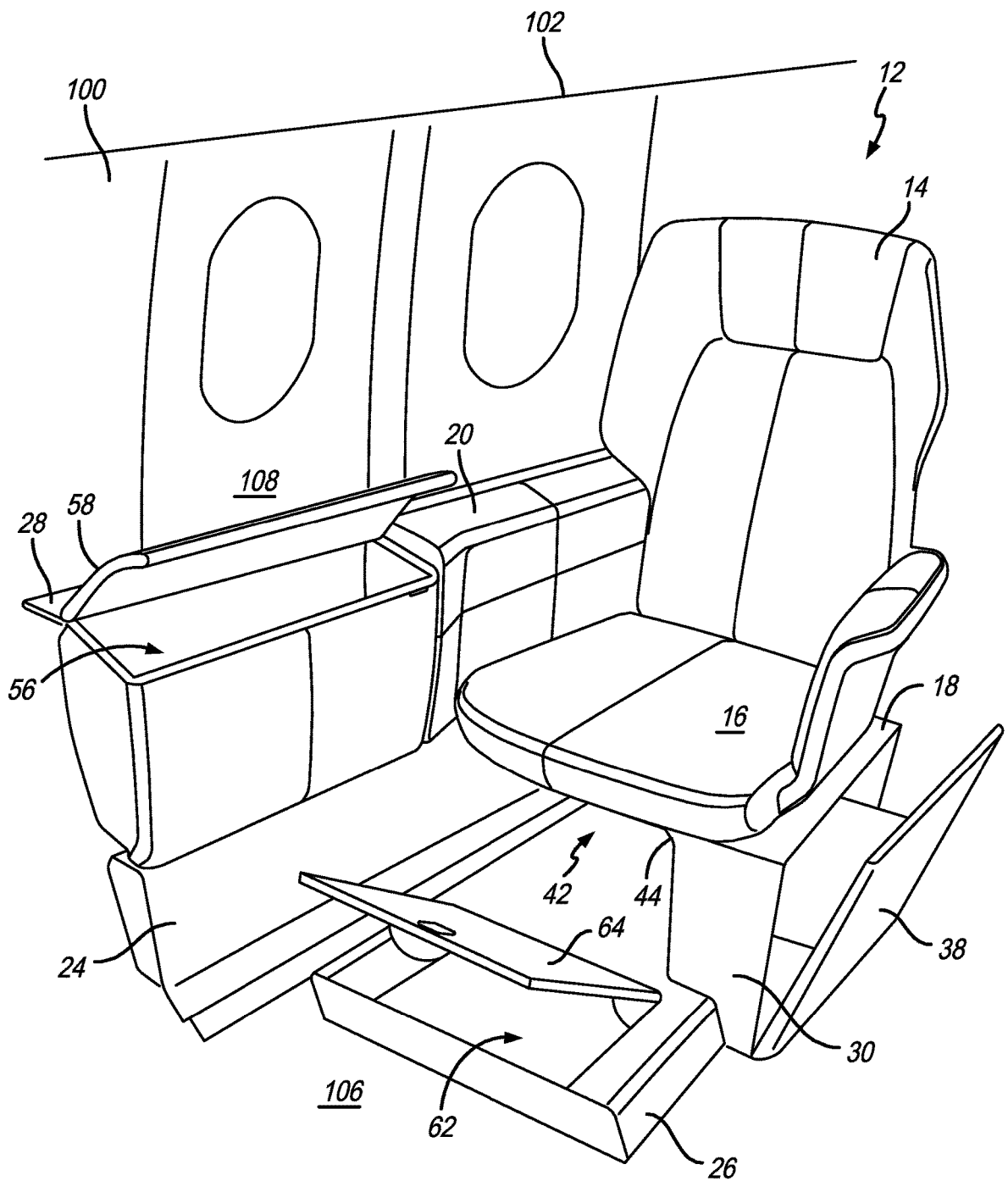
FIG. 2 is a perspective view of the seat and storage system showing some of the storage components in the open position.
Figure 3:
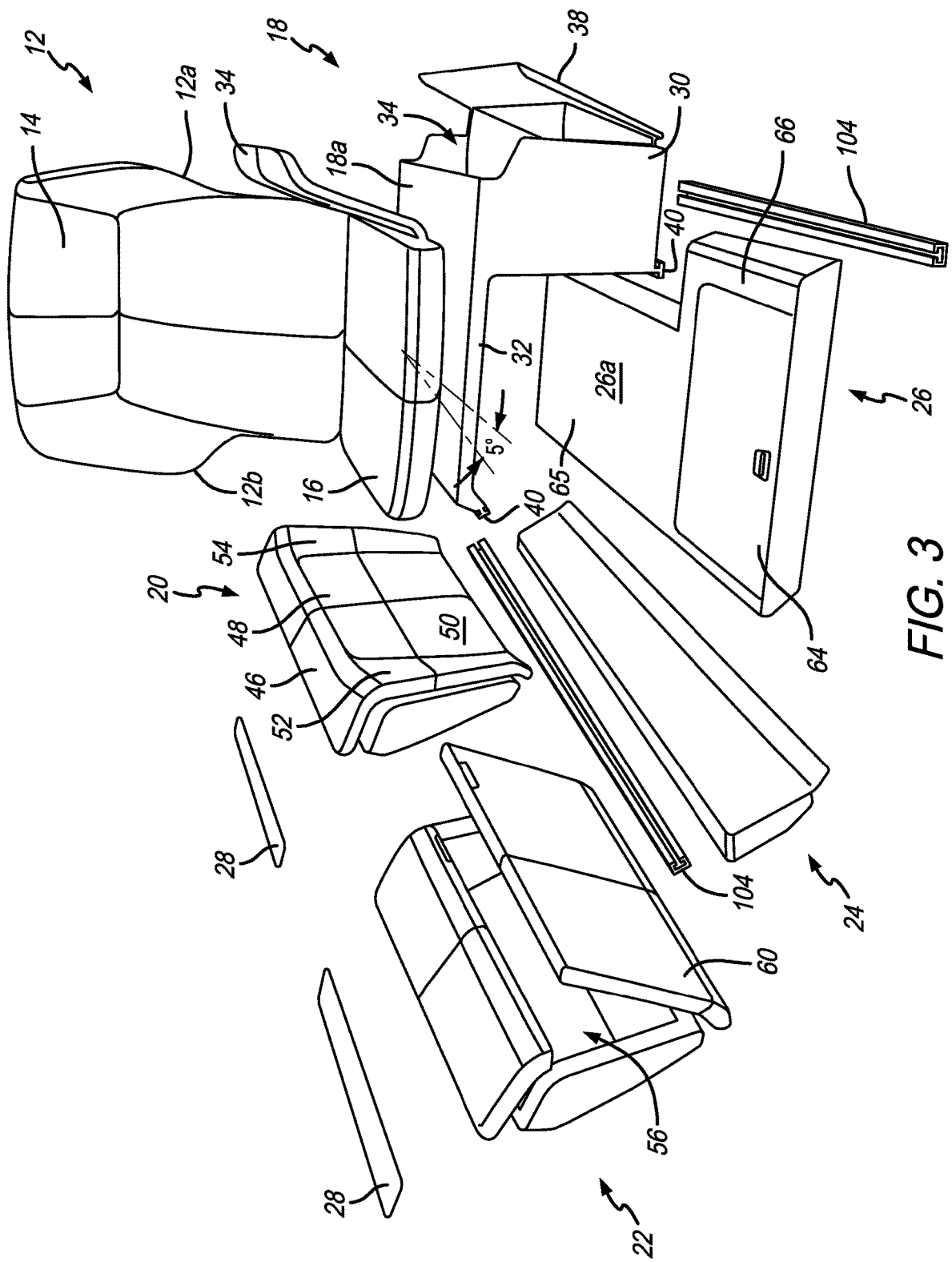
FIG. 3 is an exploded view of the seat and storage system.

As shown in FIGS. 1-3, in a preferred embodiment, the seat and storage system 10 includes seat 12 with a back portion 14 and a seat portion 16, seat storage assembly 18, aft side unit 20, forward side storage assembly 22, lower side unit 24, floor riser assembly 26, and filler panels 28. The seat storage assembly 18 includes storage therein and forms a platform on which the seat 12 can be mounted.

As shown in FIG. 3, the seat storage assembly 18 generally includes a storage portion 30 and an extension portion 32. The storage portion 30 defines a storage interior 34 with a storage opening that generally opens to the side of the seat that faces an aisle. The storage portion 30 includes a door or cover 38 that opens and closes to allow luggage or other items into the storage interior 34. The door or cover can pivot open or can slide open like a drawer. The extension portion 32 extends from the storage portion 30 toward the wall or away from the storage portion 30. Therefore, the cover 38 opens to a first side 12a of the seat and the extension portion extends toward and to the second side 12b of the seat.

As shown in FIG. 3, the seat storage assembly 18 defines a top surface 18a to which the seat 12 is secured. In a preferred embodiment, the seat 12 can be rotated with respect to the seat storage assembly 18 and the top surface 18a. FIG. 3 shows a 5° angle as an example. The seat can be rotated any angle between 1° and 89° inwardly or outwardly. In a preferred embodiment, when mounted in an aircraft, the seat storage assembly 18 is mounted to the seat tracks 104 mounted on either the floor 106 or wall 108. Preferably, the seat storage assembly 18 includes mounting members 40 that connect to the seat tracks 104. As shown in FIG. 3, in a preferred embodiment, the mounting members 40 are mounted on or attached to the distal end of the extension portion 32 (for connecting to the wall seat track 104) and on the bottom of the storage portion 30 (for connecting to the floor seat track 104).

As shown in FIG. 1, when positioned next to the wall of the fuselage and above the floor, the seat storage assembly 18 defines an under seat cavity 42 below a bottom surface 44 of the extension portion 32.

Figure 4:
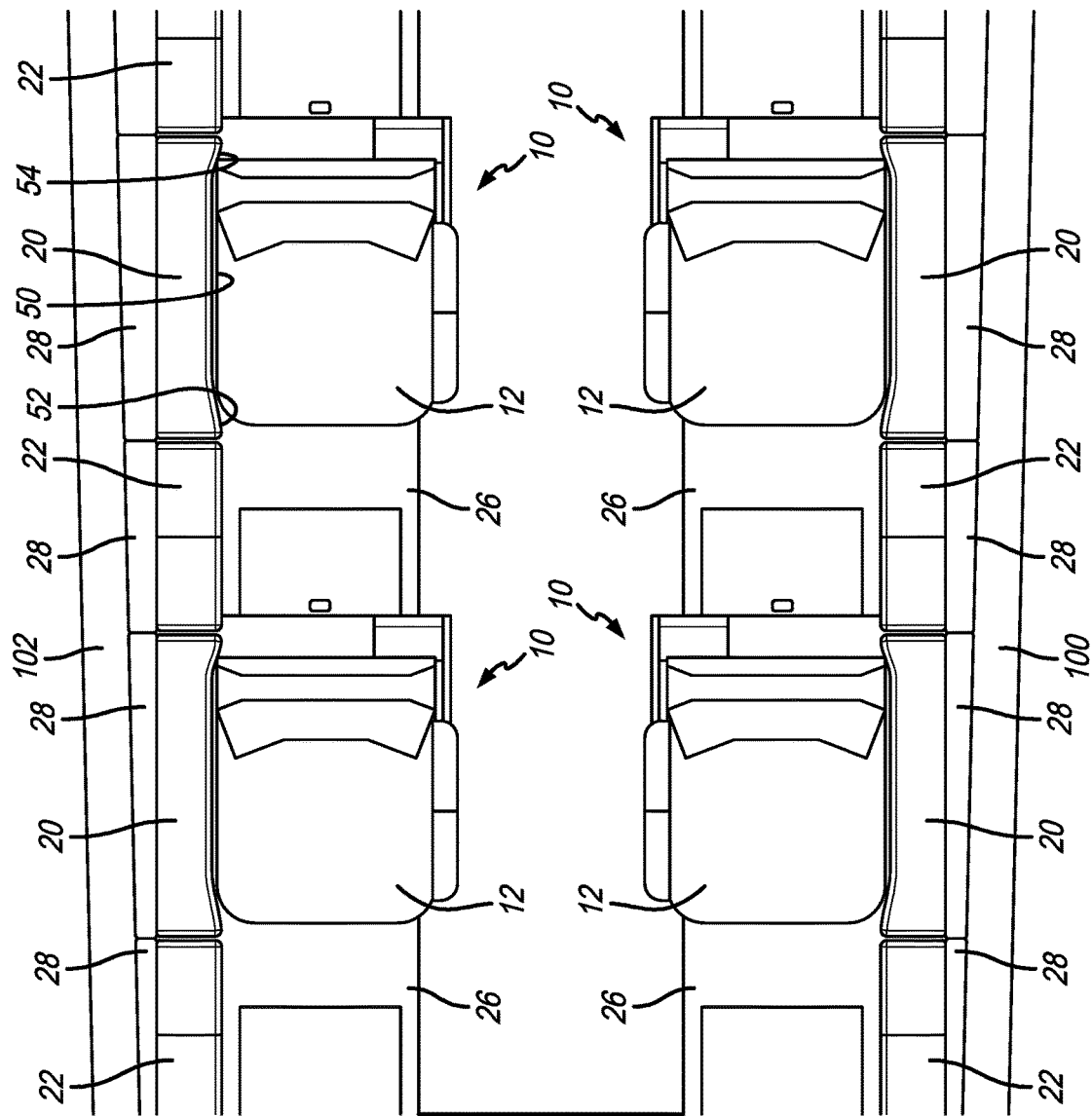
FIG. 4 is a top plan view of a plurality of the seat and storage systems positioned in a tapering aircraft fuselage with a single aisle.

The aft side unit 20 is positioned between the seat 12 and the wall 108 and includes an armrest 46 on its upper surface. The inside surface 48 is contoured to allow a passenger to sit in various positions. In a preferred embodiment, the inside surface 48 includes a middle side surface 50 and forward and aft side inclined surfaces 52 and 54. As shown in FIG. 1, the seat portion 16 can be contoured to match the middle, forward and aft inclined surfaces. In a preferred embodiment, the forward and aft side included surfaces 52 and 54 incline toward the aisle and toward the forward side storage assemblies 22 aft and forward thereof. As shown in FIG. 4, the forward and aft side included surfaces 52 and 54 extend to a point where they include a thickness that is generally the same as the forward side storage assemblies 22 aft and forward thereof. In other words, the ends or corners of the forward and aft side included surfaces 52 and 54 are generally flush with the forward side storage assemblies 22 aft and forward thereof.

The forward side storage assembly 22 is positioned against the wall 108, forward of the seat 12 and preferably flush with the aft side unit 20. The forward side storage assembly 22 defines a storage interior 56 and includes a cover or door that accesses the storage interior 56. As shown in FIGS. 2 and 3, the forward side storage assembly 22 can include one or more doors 58 and 60. Door 58 opens upwardly or to the top of the forward side storage assembly 22 and door 60 opens inwardly or inboard of forward side storage assembly 22.

Filler panels 28 can be positioned between one or both of the forward side storage assembly 22 and the aft side unit 20. As shown in FIG. 4, the filler panels 28 can be of different widths so that forward side storage assemblies 22 and aft side units 20 of the same size can be used in a tapering fuselage. In other words, as the fuselage tapers and a group of forward side storage assemblies 22 and aft side units 20 are placed in the fuselage, the spaces between the forward side storage assemblies 22 and aft side units 20 and the wall will change. Therefore, variable width filler panels 28 can be used to fill the gaps. The filler panels themselves each include a tapering width. In another embodiment, the filler panels can include a constant width, but the width can become narrower as the filler panels are positioned forward in the fuselage. A combination of both constant and tapering width filler panels can also be used.

The lower side unit 24 is preferably positioned below the forward side storage assembly 22 and aft side unit 20. Preferably, the lower side unit 24 defines a lower side unit interior that can be used to run aircraft systems therethrough or as further storage. If the interior is used as a conduit, the ends are either open or include openings therein that align with openings in an adjacent lower side unit 24. This allows cables or other components to extend along the length of the fuselage through the various lower side units 24.

The floor riser assembly 26 is positioned on the floor and is used for passengers to put their feet on the top surface. To accommodate the storage space in the seat storage assembly 18, the seat 12 may be positioned higher than in a typical aircraft. The floor riser assembly 26 therefore raises the level of the "floor" of the top surface 26a of the floor riser assembly 26. In a preferred embodiment, the floor riser assembly 26 defines a storage interior 62 and includes a door 64 that opens upwardly or slides to access the storage interior 62. Preferably, the floor riser assembly 26 includes an aft portion 65 that fits under the seat 12 and partially defines the under seat cavity 42. The aft portion 65 is preferably narrower than the forward portion 66 that includes the door 64 thereon.

Figure 5A:
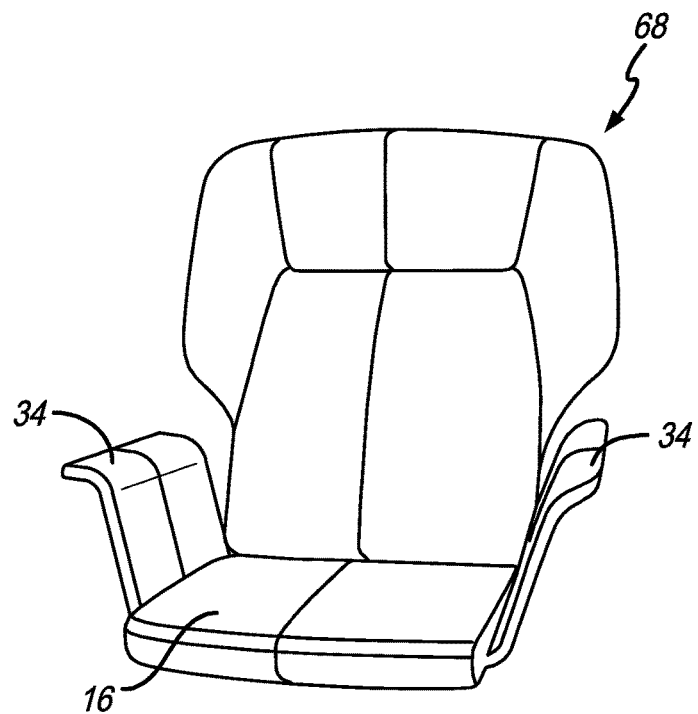
FIG. 5A is a perspective view of a symmetrical seat.
Figure 5B:
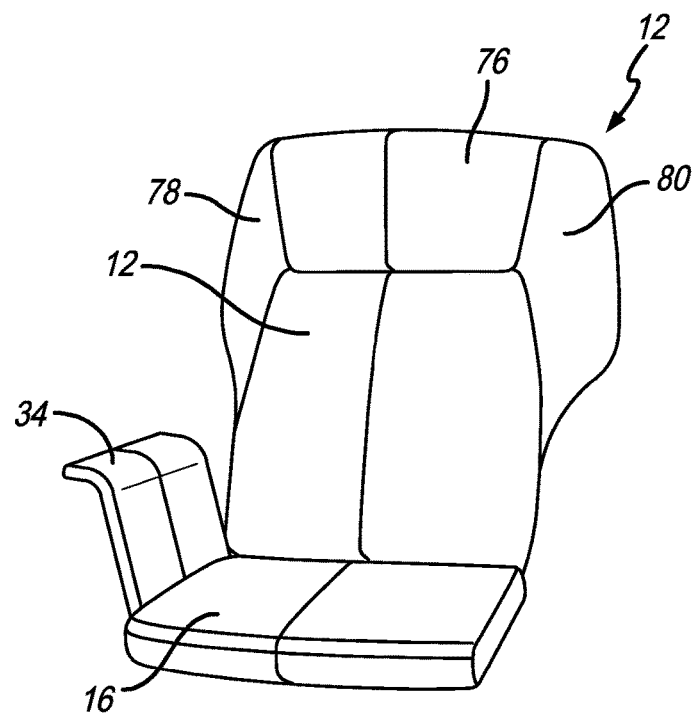
FIG. 5B is a perspective view of a right side seat.
Figure 5C:
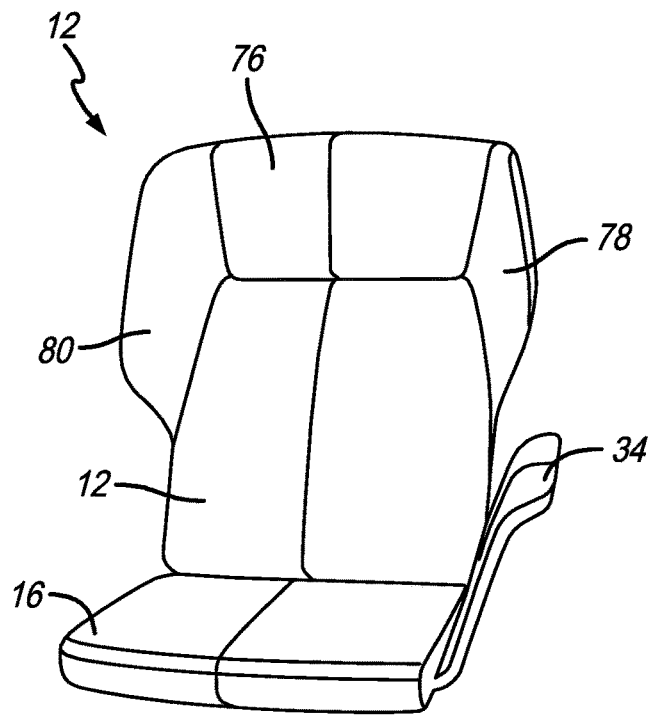
FIG. 5C is a perspective view of a left side seat.

FIGS. 5A-5C demonstrate a method for manufacturing the seats 12 in accordance with a preferred embodiment. The seats will be positioned in an aircraft on the left and right sides thereof and each installed seat only includes a single armrest 34 and is contoured or shaped asymmetrically. However, for ease of manufacturing, the seats are originally made or molded with a symmetrical shape and with two armrests. See seat 68 in FIG. 5A. The seats can then be trimmed so that they can be positioned on either the left or right side of the aircraft. See the left side seat in FIG. 5B and the right side seat in FIG. 5C. In particular, the back portion 14 of the seat 12 is formed or trimmed to be asymmetrical. As shown in FIGS. 5B and 5C, the back portion 14 includes a center portion 76 and inboard and outboard portions 78 and 80 that extend outwardly from the center portion 76. Preferably, the outboard portion 80 is wider or extends further outwardly from the center portion 76 than the inboard portion 78. Also, as shown in FIG. 1, in a preferred embodiment, the outboard portion 80 contours around and extends above the top surface of the aft side unit 20. Furthermore, due to the dimensional constraints of the tapering fuselage, the seats can be trimmed or shaped according to where they are going to be positioned within the aircraft. In other words, even seats that are positioned on the right side of the aircraft can be trimmed to different dimensions to fit as desired.

Figure 6:
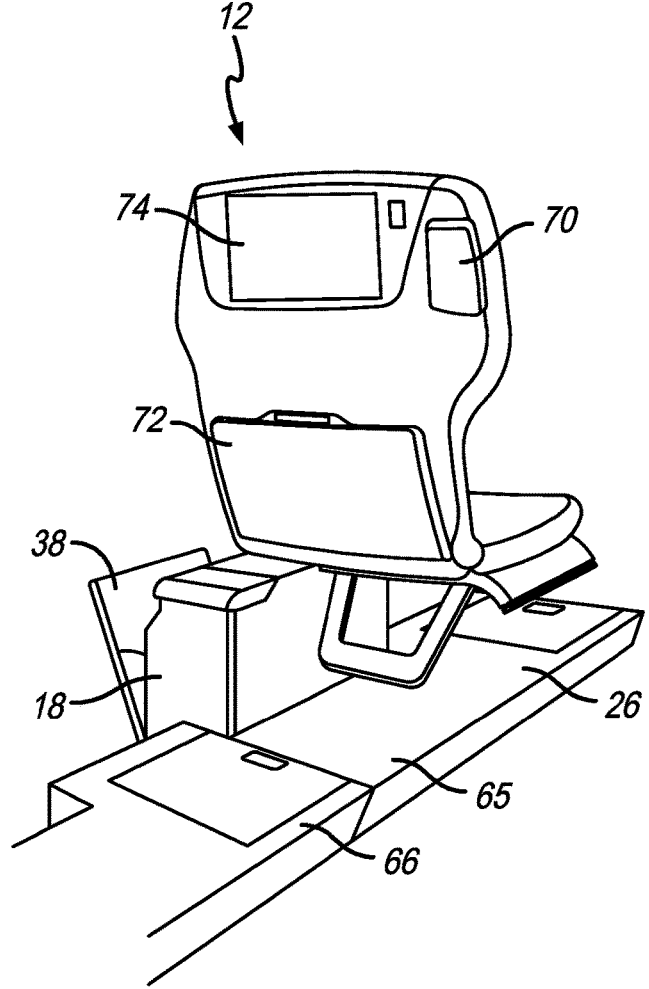
FIG. 6 is a rear perspective view of the seat and storage system.

FIG. 6 shows a seat 12 from the rear. In a preferred embodiment, the seat 12 can include the oxygen compartment 70, and all the components associated therewith, on the back or side of the back portion 14. Therefore, in an emergency, the oxygen mask is accessible to a passenger seated in the seat behind the seat where the oxygen assembly is located. FIG. 6 also shows the tray table 72 and in-flight entertainment 74 on the back of the seat 12. FIG. 6 also shows how the floor riser assemblies 26 of forward and aft seats abut or connect to one another to form a continuous "floor surface" for passengers.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An aircraft comprising:
   a fuselage that includes a floor, first and second outboard walls and an aisle,
   a first seat and storage system that is positioned between the first outboard wall and the aisle, wherein the first seat and storage system includes a seat that includes a seat back and a seat portion that defines a width between an aisle side and an outboard side, a storage assembly that includes a storage portion and an extension portion, wherein the storage portion defines a storage interior and a storage opening and includes a cover that is movable between an open position and a closed position and an outboard panel, wherein the storage portion extends from the aisle side and less than half the width of the seat portion, such that the outboard panel and at least a portion of the storage interior is positioned below the seat, wherein the storage opening faces the aisle, wherein the extension portion extends from the storage portion toward the first outboard wall, wherein the storage assembly defines a top surface, wherein the seat is secured to the top surface, and wherein the storage assembly defines an under seat cavity below a bottom surface of the extension portion;

wherein the first seat and storage system includes a floor riser assembly positioned below the extension portion, wherein the floor riser assembly defines a storage interior and includes a door that is movable between a closed position and an open position where the storage interior is accessible, wherein at least a first portion of the storage interior is located below the extension portion, and wherein a second portion of the storage interior is located forward of the seat.

2. The aircraft of claim 1 wherein a top surface of the floor riser assembly, the bottom surface of the extension portion and the outboard panel of the storage portion at least partially define the under seat cavity.

3. The aircraft of claim 2 wherein at least a portion of the storage interior of the storage portion is positioned at a level below the top surface of the floor riser assembly.

4. The aircraft of claim 3 wherein the floor riser assembly includes an aft portion and a forward portion, and wherein the width of the aft portion is less than the width of the forward portion.

5. The aircraft of claim 1 wherein the first seat and storage system includes an aft side unit positioned between the seat and the first outboard wall, wherein an upper surface of the aft side unit comprises an arm rest, wherein the aft side unit includes a middle side surface and a forward side inclined surface, wherein the seat portion is positioned adjacent the middle surface and the forward inclined surface extends forwardly of the seat portion and inclines toward the aisle.

6. The aircraft of claim 1 wherein the first seat and storage system includes a forward side storage assembly that includes a main body portion that defines a storage interior and a door that is movable between a closed position and an open position where the storage interior is accessible.

7. The aircraft of claim 6 wherein the door of the forward side storage assembly is located on a top thereof and is movable upwardly to the open position.

8. The aircraft of claim 6 wherein the door of the forward side storage assembly is located on a side thereof and is movable inwardly to the open position.

9. The aircraft of claim 1 wherein the back portion of the seat is asymmetrical, wherein the back portion includes a center portion and inboard and outboard portions that extend outwardly from the center portion, and wherein the outboard portion is wider than the inboard portion.

10. The aircraft of claim 5 wherein the fuselage first and second outboard walls taper from a rear of the fuselage toward a front of the fuselage, wherein a filler panel is positioned between the aft side unit and the first outboard wall, and wherein the filler panel has a tapering width.

11. The aircraft of claim 1 wherein the seat is rotatable with respect to the seat storage assembly between a position where the seat faces forwardly and a position where the seat is angled toward the first wall.

12. An aircraft comprising:
a fuselage that includes a floor, first and second outboard walls and an aisle,
a first seat and storage system that is positioned between the first outboard wall and the aisle, wherein the first seat and storage system includes
a seat that includes a seat back and a seat portion that defines a width between an aisle side and an outboard side, wherein the back portion of the seat is asymmetrical, wherein the back portion includes a center portion and inboard and outboard portions that extend outwardly from the center portion, and wherein the outboard portion is wider than the inboard portion,
a storage assembly that includes a storage portion and an extension portion, wherein the storage portion defines a storage interior and a storage opening and includes a cover that is movable between an open position and a closed position and an outboard panel, wherein the storage portion extends from the aisle side and less than half the width of the seat portion, such that the outboard panel and at least a portion of the storage interior is positioned below the seat, wherein the storage opening faces the aisle, wherein the extension portion extends from the storage portion toward the first outboard wall, wherein the storage assembly defines a top surface, wherein the seat is secured to the top surface, and wherein the storage assembly defines an under seat cavity below a bottom surface of the extension portion,
a floor riser assembly positioned below the extension portion, wherein the floor riser assembly defines a storage interior and includes a door that is movable between a closed position and an open position where the storage interior is accessible, wherein a top surface of the floor riser assembly partially defines the under seat cavity, wherein the floor riser assembly includes an aft portion and a forward portion, and wherein the width of the aft portion is less than the width of the forward portion, wherein at least a first portion of the storage interior is located below the extension portion, and wherein a second portion of the storage interior is located forward of the seat,
an aft side unit positioned between the seat and the first outboard wall, wherein an upper surface of the aft side unit comprises an arm rest, wherein the aft side unit includes a middle side surface and a forward side inclined surface, wherein the seat portion is positioned adjacent the middle surface and the forward inclined surface extends forwardly of the seat portion and inclines toward the aisle,
a forward side storage assembly positioned forward of the aft side unit, wherein the forward side storage assembly includes a main body portion that defines a storage interior and a door that is movable between a closed position and an open position where the storage interior is accessible, and
a lower side unit positioned below the aft side unit and the forward side storage assembly, wherein the lower side unit defines a lower side unit interior.

13. The aircraft of claim 12 wherein the first and second outboard walls taper from a rear of the fuselage toward a front of the fuselage, wherein a first filler panel is positioned between the aft side unit and the first outboard wall and a second filler panel is positioned between the forward side storage assembly and the first outboard wall, and wherein the first filler panel has a greater width than the second filler panel.

14. A seat and storage system comprising:
   a seat that includes a seat back and a seat portion that defines a width between an aisle side and an outboard side, wherein the seat includes first and second sides,
   a storage assembly that includes a storage portion and an extension portion, wherein the storage portion defines a storage opening and includes a cover that is movable between an open position and a closed position and an outboard panel, wherein the storage portion extends from the aisle side and less than half the width of the seat portion, such that the outboard panel and at least a portion of the storage interior is positioned below the seat, wherein the storage opening is open to the first side of the seat, wherein the extension portion extends from the storage portion toward the second side of the seat, wherein the storage assembly defines a top surface, wherein the seat is secured to the top surface, and wherein the storage assembly defines an under seat cavity below a bottom surface of the extension portion, and
   a floor riser assembly positioned below the extension portion, wherein the floor riser assembly defines a storage interior and includes a door that is movable between a closed position and an open position where the storage interior is accessible, wherein at least a first portion of the storage interior is located below the extension portion, and wherein a second portion of the storage interior is located forward of the seat.

15. The seat and storage system of claim 14 wherein a top surface of the floor riser assembly partially defines the under seat cavity.

16. The seat and storage system of claim 15 wherein the floor riser assembly includes an aft portion and a forward portion, and wherein the width of the aft portion is less than the width of the forward portion.

17. The seat and storage system of claim 14 wherein the seat and storage system includes an aft side unit positioned on the second side of the seat, wherein an upper surface of the aft side unit comprises an arm rest, wherein the aft side unit includes a middle side surface and a forward side inclined surface, wherein the seat portion is positioned adjacent the middle surface and the forward inclined surface extends forwardly of the seat portion and inclines toward the first side of the seat.

18. The seat and storage system of claim 17 wherein the seat and storage system includes a forward side storage assembly positioned forwardly of the aft side unit, wherein the forward side storage unit includes a main body portion that defines a storage interior and a door that is movable between a closed position and an open position where the storage interior is accessible.

19. The seat and storage system of claim 14 wherein the back portion of the seat is asymmetrical, wherein the back portion includes a center portion and inboard and outboard portions that extend outwardly from the center portion, and wherein the outboard portion is wider than the inboard portion.

* * * * *